Patented Dec. 9, 1930

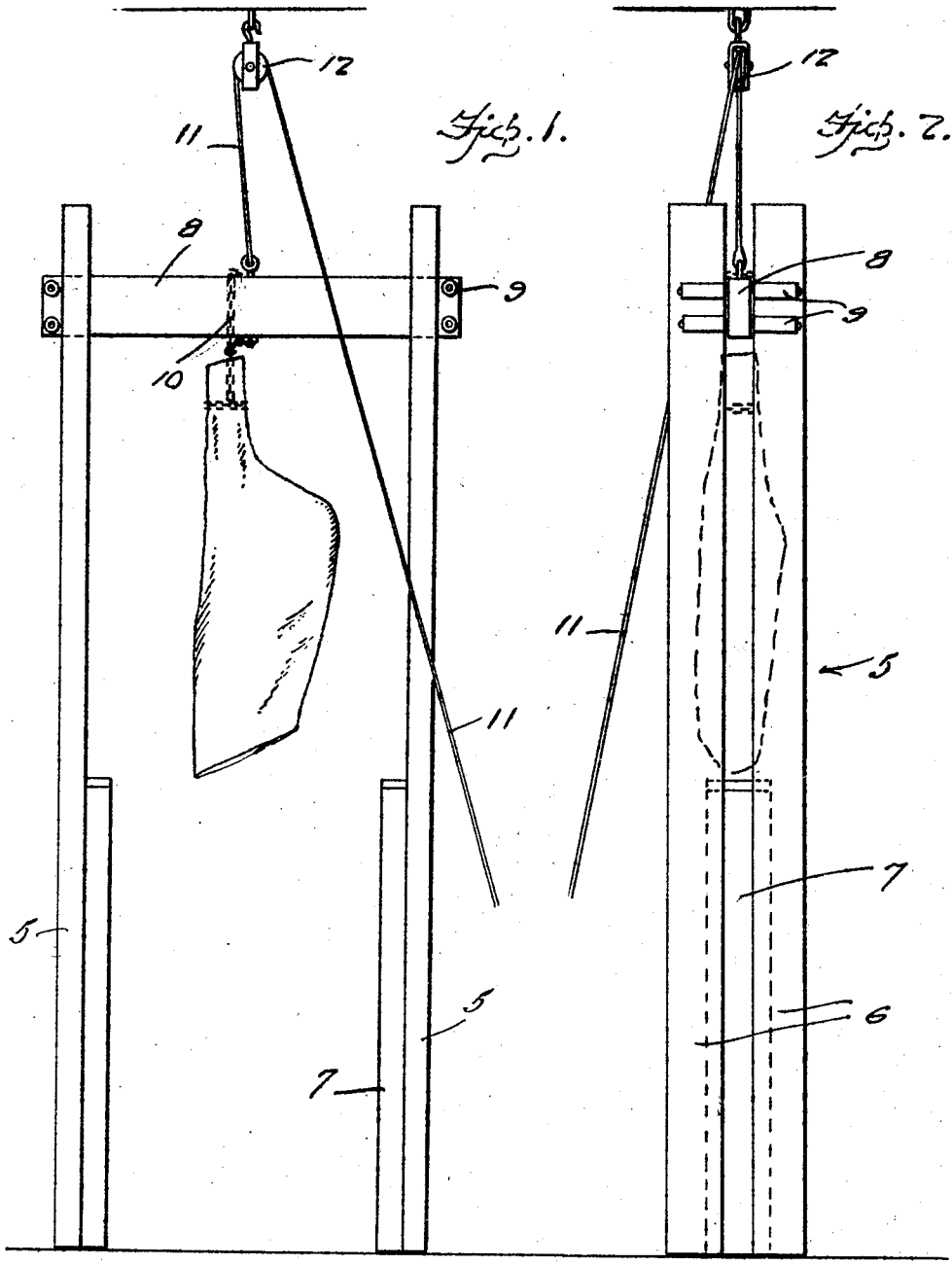

1,784,580

UNITED STATES PATENT OFFICE

PERCY J. DEACON, OF LAKE WORTH, FLORIDA

MEANS FOR TENDERING MEATS

Application filed February 2, 1928. Serial No. 251,398.

This invention relates to new and useful improvements in method of and means for tendering meat, and aims to provide an improved method and apparatus whereby large cuts of beef, such as the sides, hind-quarters, or rounds, or other large cuts of meat may be easily and effectively tendered.

In carrying out the present invention, the large cut of beef or other meat is raised to a predetermined height and then dropped, the descent of the cut being stopped prior to its engagement with a meat block or other support so that the sinews of the cut will be so jerked or drawn as to properly tender the same.

Furthermore, the invention aims to provide a simple and inexpensive apparatus whereby this method may be carried out.

In the drawing wherein there is disclosed one means whereby my improved method may be carried out:

Figure 1 is an elevation of the apparatus, and

Figure 2 is an edge view thereof.

Now having reference to the drawing, 5—5 designate a pair of relatively elongated vertical standards, each of which consists of a pair of spaced parallel bars 6—6. Arranged at the inner sides of each pair of bars providing the side standards 5—5 and between the space between the bars is a bar 7 terminating at its upper end at a point above the floor level or other support to which the standards are secured.

Arranged horizontally between the side standards 5—5 and projecting between the bars 6—6 of each standard at its opposite ends is a cross bar 8 equipped outwardly of the standards 5—5 and at opposite sides thereof with pairs of rollers 9 for engagement with the bars of the standards to prevent the disengagement of the bar 8 at its opposite ends from between the spaced bars of said standards and to facilitate the proper reciprocatory movement of the cross bar with respect to said standards.

Intermediate the ends of the bar 8 the same is equipped with suitable means 10 to permit the butt of a side, hind-quarter, or round of meat, or a large cut of other meat to be suspended from said cross bar. Furthermore, attached intermediate the ends of this cross bar is one end of a rope or cable 11 that is guided over a pulley 12 supported above the device so that the cross bar 8 as well as the cut of meat may be raised with respect to the side standards 5—5.

Obviously, after the cut of meat is raised to a point adjacent the upper ends of the side standards 5—5 the cable 12 is released, whereupon the cross bar 8 as well as the large cut of meat will drop with great force, the dropping being stopped with a jerk by the ends of the cross bar 8 striking against the upper ends of the bars 7 at the inner sides of the vertical standards 5—5. This action should be repeated a number of times, and obviously, each action will result in the jerking and straining of the tough muscles and sinews within the cut of meat resulting in the exceptional tendering of the same.

Obviously, the present method of tendering a large cut of meat may be carried by an apparatus constructed along the general lines of the apparatus disclosed. In other words, it is not absolutely necessary in the proper carrying out of my method to use a structure identical with that disclosed in the drawing.

Having thus described the invention, what I claim as new and desire to secure by Letters Patent is:—

In an apparatus of the class described, a pair of vertical spaced standards, each standard including a pair of spaced bars, stop forming members extending upwardly from the lower ends of the standards at the space between the bars of each standard, the upper ends of said stop forming members terminating at the intermediate portion of said standard to form stops, a cross bar arranged for vertical sliding movement between the spaced standards, the ends of the cross bar being disposed between the spaced bars of each standard, said cross bar being of a length greater than the distance between the outer sides of the standards, horizontally disposed rollers extending laterally from the opposite sides of the projecting ends of the cross bars for engagement with the outer sides of the bars of the respective standards, means for suspending a cut of meat from the intermediate portion of the cross bar, elevating means for the cross bar, said cross bar being adapted to strike the upper ends of the stop forming members when the elevating means is released to limit the downward sliding movement of the cross bar and impart a sudden jerk to the meat suspended from said cross bar for the purpose described.

In testimony whereof I affix my signature.

PERCY J. DEACON.